(12) United States Patent
Kweon

(10) Patent No.: US 11,924,660 B2
(45) Date of Patent: Mar. 5, 2024

(54) METHOD AND APPARATUS FOR GROUP MANAGEMENT FOR GROUP EVENT MONITORING

(71) Applicant: Samsung Electronics Co., Ltd., Suwon-si (KR)

(72) Inventor: Kisuk Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/487,496

(22) Filed: Sep. 28, 2021

(65) Prior Publication Data

US 2022/0104045 A1 Mar. 31, 2022

(30) Foreign Application Priority Data

Sep. 29, 2020 (KR) .................. 10-2020-0126839

(51) Int. Cl.
*H04W 24/08* (2009.01)
*H04W 4/08* (2009.01)
*H04W 8/04* (2009.01)

(52) U.S. Cl.
CPC ............. *H04W 24/08* (2013.01); *H04W 4/08* (2013.01); *H04W 8/04* (2013.01)

(58) Field of Classification Search
CPC .......... H04W 24/08; H04W 4/08; H04W 8/04
USPC ....................................................... 370/329
See application file for complete search history.

(56) References Cited

U.S. PATENT DOCUMENTS

| | | |
|---|---|---|
| 2011/0128911 A1 | 6/2011 | Shaheen |
| 2014/0112222 A1 | 4/2014 | Park et al. |
| 2016/0007138 A1* | 1/2016 | Palanisamy ............. H04W 4/08 455/41.2 |
| 2018/0317163 A1* | 11/2018 | Lee ........................ H04W 48/18 |
| 2019/0028866 A1 | 1/2019 | Baek et al. |
| 2019/0149413 A1 | 5/2019 | Kim et al. |
| 2019/0281439 A1 | 9/2019 | Won et al. |
| 2019/0394712 A1* | 12/2019 | Rönneke ................ H04W 4/70 |

(Continued)

FOREIGN PATENT DOCUMENTS

| | | |
|---|---|---|
| EP | 3 386 220 A1 | 10/2018 |
| WO | 2020/155177 A1 | 8/2020 |

OTHER PUBLICATIONS

3GPP; TSG SA; Architecture enhancements to facilitate communications with packet data networks and applications '(Release 16)', 3GPP TS 23.682 V 16.4.0 section 5.6.1, pp. 1, 2, and 58-61, Sep. 24, 2019 (Year: 2019).*

(Continued)

*Primary Examiner* — Mark G. Pannell
(74) *Attorney, Agent, or Firm* — Jefferson IP Law, LLP

(57) ABSTRACT

The disclosure relates to a communication method and system for converging a 5th generation (5G) communication system for supporting higher data rates beyond a 4th generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. The disclosure provides a method and a device for a group management that enables addition/deletion/replacement of a group member in a group-based event monitoring method.

28 Claims, 6 Drawing Sheets

(56) References Cited

U.S. PATENT DOCUMENTS

2021/0051497 A1* 2/2021 Xu .................. H04W 28/0247
2022/0312163 A1* 9/2022 Xu ........................ H04W 4/60

OTHER PUBLICATIONS

Listing of versions of 3GPP TS 23.682 with dates, printed Feb. 13, 2023 (Year: 2023).*
Ericsson, 'Common Network Exposure', S2-2004885, SA WG2 Meeting #140E (e-meeting), Elbonia, section 5.6.1.1; and figure 5.6.1.1-1, Aug. 13, 2020.
'3GPP; TSG SA; Architecture enhancements to facilitate communications with packet data networks and applications (Release 16)', 3GPP TS 23.682 V 16.8.0 section 5.6.1, Sep. 24, 2020.
International Search Report dated Dec. 21, 2021, issued in International Patent Application No. PCT/KR2021/013259.
Extended European Search Report dated Dec. 23, 2022, issued in European Patent Application No. 21876001.5.
Chinese Office Action dated Mar. 31, 2023, issued in Chinese Patent Application No. 202180018294.9.
Chinese Office Action dated Oct. 31, 2023, issued in Chinese Patent Application No. 202180018294.9.

* cited by examiner

METHOD AND APPARATUS FOR GROUP MANAGEMENT FOR GROUP EVENT MONITORING

CROSS-REFERENCE TO RELATED APPLICATION(S)

This application is based on and claims priority under 35 U.S.C. § 119(a) of a Korean patent application number 10-2020-0126839, filed on Sep. 29, 2020, in the Korean Intellectual Property Office, the disclosure of which is incorporated by reference herein in its entirety.

BACKGROUND

1. Field

The disclosure relates to a communication system. More particularly, the disclosure relates to a group management method that enables addition/deletion/replacement of a group member in a group-based event monitoring method.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long-Term Evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency-shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a group member User Equipment (UE) management method that adds, deletes, replaces a group member UE in a group monitoring event.

Another aspect of the disclosure is to provide a method and apparatus for effectively providing a service in a wireless communication system.

Additional aspects will be set forth in part in the description which follows and, in part, will be apparent from the description, or may be learned by practice of the presented embodiments.

In accordance with an aspect of the disclosure, a method for addition, deletion, replacement, or the like in association with a group member in a group-based event monitoring method is provided.

In accordance with an aspect of the disclosure, a method for managing an event monitoring for a group of terminals in a wireless communication system performed by a first network function entity is provided. The method includes receiving, from a second network function entity, a monitoring request message for modifying a configured monitoring event, the monitoring request message including a configuration identifier corresponding to the configured monitoring event, an operation of group management for the group of terminals, and a terminal identifier indicating a terminal associated with the operation; storing the configuration identifier, the operation, and the terminal identifier based on the monitoring request message; updating the configured monitoring event for the indicated terminal based on the operation; and transmitting, to a third network function entity associated with the indicated terminal, information for modifying the configured monitoring event, the information including the configuration identifier and the terminal identifier, wherein the operation includes at least one of an addition of the terminal to the group or a deletion of the terminal from the group.

In the method, the updating the configured monitoring event is further based on the terminal identifier included in the monitoring request message.

In the method, monitoring request message is generated based on a message from an application function entity associated with the configured monitoring event, the message including a T8 long term transaction reference ID (TLTRI) for identifying the configured monitoring event, the operation, and the terminal identifier, and the configuration identifier corresponds to the TLTRI.

In the method, the configured monitoring event is modified at the third network function entity based on the information, the indicated terminal is monitored for the monitoring event by the third network function entity, in case that the operation is the addition, and the indicated terminal is suspended from monitoring for the monitoring event at the third network function entity, in case that the operation is the deletion.

In the method, in case that the operation is the addition, the updating the configured monitoring event comprises: adding the indicated terminal to the group of terminals for the configured monitoring event; and monitoring the indicated terminal for the configured monitoring event.

In the method, in case that the operation is the deletion, the updating the configured monitoring event comprises: deleting the indicated terminal from the group of terminals for the configured monitoring event; and stop monitoring the indicated terminal for the configured monitoring event.

In the method, the first network function entity is one of a home subscriber server (HSS) or a unified data management (UDM), the second network function entity is one of a service capability exposure function (SCEF) or a network exposure function (NEF), and the third network function entity is one of a mobile management entity (MME), a serving general packet radio service (GPRS) support node (SGSN), an access and mobility management function (AMF), or a session management function (SMF).

In accordance with another aspect of the disclosure, a method for managing an event monitoring for a group of terminals in a wireless communication system performed by a second network function entity is provided. The method includes receiving, from an application function entity associated with a configured monitoring event, a first monitoring request message for modifying the configured monitoring event, the first monitoring request message including a first configuration identifier corresponding to the configured monitoring event, an operation of group management for the group of terminals, and a terminal identifier indicating a terminal associated with the operation; and transmitting, to a first network function entity, a second monitoring request message based on the first monitoring request message, the second monitoring request message including a second configuration identifier corresponding to the configured monitoring event, the operation and the terminal identifier, wherein the second configuration identifier, the operation, and the terminal identifier are stored at the first network function entity based on the monitoring request message, wherein the configured monitoring event is updated for the indicated terminal based on the operation, wherein information for modifying the configured monitoring event is transmitted to a third network function entity associated with the indicated terminal from the first network function entity based on the second monitoring request message, the information including the second configuration identifier and the terminal identifier, and wherein the operation includes at least one of an addition of the terminal to the group or a deletion of the terminal from the group.

In accordance with another aspect of the disclosure, a first network function entity for managing an event monitoring for a group of terminals in a wireless communication system is provided. The first network function entity includes a transceiver and a controller configured to receive, from a second network function entity, a monitoring request message for modifying a configured monitoring event, the monitoring request message including a configuration identifier corresponding to the configured monitoring event, an operation of group management for the group of terminals, and a terminal identifier indicating a terminal associated with the operation, store the configuration identifier, the operation, and the terminal identifier based on the monitoring request message, update the configured monitoring event for the indicated terminal based on the operation, and transmit, to a third network function entity associated with the indicated terminal, information for modifying the configured monitoring event, the information including the configuration identifier and the terminal identifier, wherein the operation includes at least one of an addition of the terminal to the group or a deletion of the terminal from the group.

In accordance with another aspect of the disclosure, a second network function entity for managing an event monitoring for a group of terminals in a wireless communication system is provided. The second network function entity includes a transceiver and a controller configured to receive, from an application function entity associated with a configured monitoring event, a first monitoring request message for modifying the configured monitoring event, the first monitoring request message including a first configuration identifier corresponding to the configured monitoring event, an operation of group management for the group of terminals, and a terminal identifier indicating a terminal associated with the operation, and transmit, to a first network function entity, a second monitoring request message based on the first monitoring request message, the second monitoring request message including a second configuration identifier corresponding to the configured monitoring event, the operation and the terminal identifier, wherein the second configuration identifier, the operation, and the terminal identifier are stored at the first network function entity based on the monitoring request message, wherein the configured monitoring event is updated for the indicated terminal based on the operation, wherein information for modifying the configured monitoring event is transmitted to a third network function entity associated with the indicated terminal from the first network function entity based on the second monitoring request message, the information including the second configuration identifier and the terminal identifier, and wherein the operation includes at least one of an addition of the terminal to the group or a deletion of the terminal from the group.

In order to add, delete, replace a UE according to a group monitoring event of the related art, an existing monitoring event configuration needs to be canceled and a new monitoring event needs to be configured. However, according to the disclosure, addition, deletion, and replacement of a group member can be efficiently performed without canceling an existing configuration.

Embodiments of the disclosure can provide a method and apparatus for effectively providing a service in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
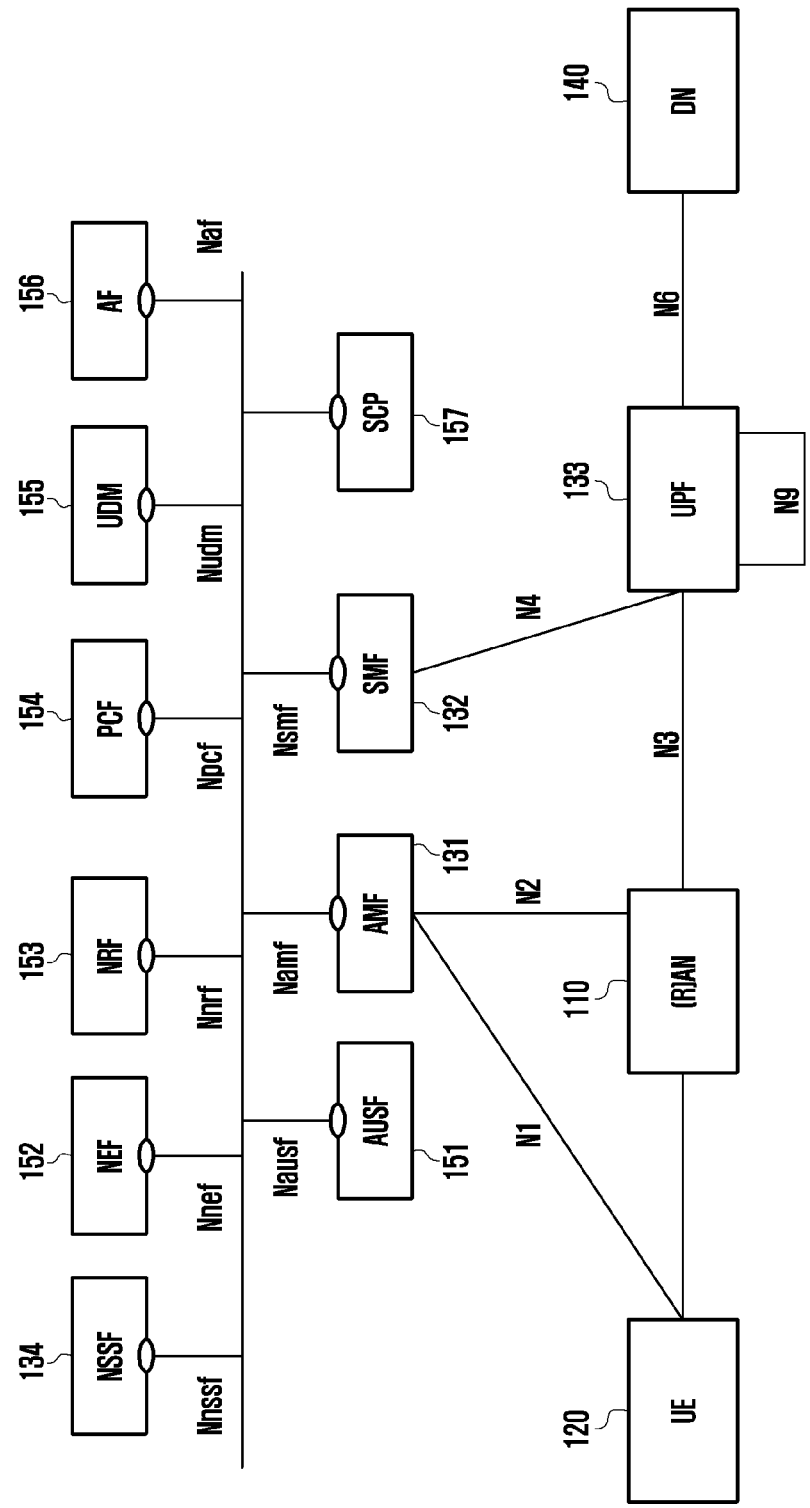
FIG. 1 is a diagram illustrating a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit".

Moreover, the elements and "units" or may be implemented to reproduce one or more CPUs within a device or a security multimedia card.

In the following description, a base station is an entity that allocates resources to terminals, and may be at least one of a Node B, a base station (BS), an eNode B, a gNode B, a wireless access unit, a base station controller, and a node on a network. A terminal may include a user equipment (UE), a mobile station (MS), a cellular phone, a smartphone, a computer, or a multimedia system capable of performing communication functions. Further, embodiments of the disclosure as described below may also be applied to other communication systems having similar technical backgrounds or channel types to the embodiments of the disclosure. In addition, based on determinations by those skilled in the art, the embodiments of the disclosure may be applied to other communication systems through some modifications without significantly departing from the scope of the disclosure.

In the following description, terms for identifying access nodes, terms referring to network entities or network functions (NFs), terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards.

Further, in the following description, terms for identifying access nodes, terms referring to network entities or network functions (NFs), terms referring to messages, terms referring to interfaces between network entities, terms referring to various identification information, and the like are illustratively used for the sake of convenience. In the disclosure, the term "network object" may be used interchangeable with the term "network entity". Therefore, the disclosure is not limited by the terms as used herein, and other terms referring to subjects having equivalent technical meanings may be used.

For ease of description, subjects that exchange information for access control and state management are collectively called an NF. The NF may be, for example, at least one of an access and mobility management function (AMF) device, a session management function (SMF) device, and a unified data management (UDM) device. However, embodiments of the disclosure may be equally applied even when an NF is actually implemented as an instance (an AMF instance, an SMF instance, a UDM instance, or the like).

In the disclosure, an instance is the state in which a predetermined NF is in the form of code of software, and is executable by being assigned with physical and/or logical resources from a computing system in order to perform the function of the NF in a physical computing system, for example, a predetermined computing system existing on a core network. Therefore, the AMF instance, the SMF instance, and the UDM instance are capable of using physical and/or logical resources by being assigned with the resources for an AMF operation, an SMF operation, and a UDM operation, respectively, from the predetermined computing system existing on the core network. Accordingly, the AMF instance, SMF instance, and UDM instance that are assigned with physical and/or logical resources for AMF, SMF, and UDM operations from the predetermined computing system existing on the network may perform the same operations as the case when a physical AMF, SMF, and UDM devices are present. Therefore, in the embodiments of the disclosure, if a thing described as an NF (AMF, SMF, ultraviolet protection factor (UPF), UDM, unified data repository (UDR), policy and charging function (PCF), and the like) may be replaced with an NF instance, or a thing described as an NF instance may be replaced with an NF. In the same manner, in the embodiments of the disclosure, a thing described as a NW slice may be replaced with an NW slice instance, or a thing described as a NW slice instance may be replaced with an NW slice.

FIG. 1 is a diagram illustrating a wireless communication system according to an embodiment of the disclosure.

Although FIG. 1 illustrates network entities based on an NR wireless communication system, an LTE wireless communication system may be also understood based on corresponding entities.

Referring to FIG. 1, as some nodes that use wireless channels in a wireless communication system, a base station (radio access node (RAN)) 110 and a user equipment (UE) 120 are illustrated. Although FIG. 1 illustrates only the single base station 110 and the single UE 120, another base station which is the same as or similar to the base station 110 may be further included. In addition, FIG. 1 illustrates only the case in which only the single UE 120 performs communication within the single base station 110. However, it is apparent that a plurality of UEs are actually capable of performing communication within the single base station 110.

The base station 110 may be a network infrastructure that provides wireless access to the UE 120. The base station 110 may have a coverage area defined by a predetermined geographical area based on the distance at which the base station 110 is capable of delivering a signal (not illustrated in FIG. 1). The base station 110 may be referred to as an 'access point (AP)', an 'eNodeB (eNB)', a '5$^{th}$ generation node (5G node)', a 'next generation NodeB (gNB)', a 'wireless point', a 'transmission/reception point (TRP)", or other terms having the technical meaning equivalent thereto, in addition to a base station.

The UE 120 may be a device used by a user, and may perform communication with the base station 110 via a wireless channel. Depending on the case, the UE 120 may operate, irrespective of handling by a user. For example, the UE 120 is a device that performs machine type communication (MTC), and may not be carried by a user. The UE 120 illustrated in FIG. 1 may include at least one portable user device, and may include at least one MTC. The UE 120 of FIG. 1 may be referred to as a 'terminal', a 'mobile station', a 'subscriber station', a 'remote terminal', a 'wireless terminal', a 'user device', or other terms having meanings equivalent thereto.

An AMF device 131 may be a network entity that performs wireless network access and mobility management in association with the UE 120. The AMF device may correspond to a mobility management entity (MME) of an LTE system. An SMF device 132 may be a network entity that manages a connection of a packet data network for providing packet data to the UE 120. The SMF device may correspond to a serving general packet radio service (GPRS) supporting node (SGSN) in the LTE system. The connection between the UE 120 and the SMF 132 may be a protocol data unit (PDU) session.

A user plane function (hereinafter, referred to as a UPF) device 133 may be a gateway or a network entity that plays a role of a gateway that transmits a packet transmitted or received by the UE 120. A UPF 133 may be connected to a data network (DN) 140 connected via the Internet, and may provide a path for data transmission or reception between the UE 120 and the DN 140. Therefore, the UPF 133 may route, to the Internet data network, data that needs to be transmitted over the Internet among packets that the UE 120 transmits.

A network slice selection function (NSSF) device 134 may be a network entity that performs a network selection operation described in the disclosure, for example, an operation of selecting a network slice.

An authentication server function (AUSF) device 151 may be a device (network entity) that provides a service for processing subscriber authentication.

A network exposure function (NEF) device 152 may be capable of accessing information that manages the UE 120 in a 5G network, may subscribe to a mobility management event associated with the corresponding UE, may subscribe to a session management event associated with the corresponding UE, may request session related information, may set charging information associated with the corresponding UE, may request changing of a PDU session policy associated with the corresponding UE, and may transmit small data associated with the corresponding UE. The NEF device may correspond to a service capability exposure function (SCEF) of the LTE system.

A network repository function (NRF) device 153 may be an NF (network entity) that stores the state information of NFs, and has a function of processing a request for discovering an NF accessible by other NFs.

A policy and charging function (PCF) device 154 may be a network entity that applies a service policy of a mobile communication operator with respect to the UE 120, a charging policy, and a policy associated with a PDU session.

A unified data management (UDM) 155 may be a network entity that stores information associated with a subscriber and/or the UE 120. The UDM may correspond to a home subscriber server (HSS) of the LTE system.

An application function (AF) device 156 may be an NF (network entity) that has a function of providing a service to users by interoperating with a mobile communication network. The AF may correspond to a service capability server/application server (SCS/AS) of the LTE system.

A service communication proxy (SCP) device 157 may be an NF (network entity) that provides a function of performing NF discovery for communication between NFs, a function of transmitting a message between NFs, and the like. The SCP 157 may operate in the state of being integrated with the NRF 153 depending on an operator. In this instance, the SCP 157 may include the function of the NRF 153, or the NRF 153 may include the function of the SCP 157.

The above-described AMF device 131, SMF device 132, UPF device 133, NSSF device 134, AUSF device 151, NEF device 152, NRF device 153, PCF device 154, UDM device 155, AF device 156, and SCP device 157 may be provided in the form of software or firmware operating in at least one or two or more devices and/or systems. In addition, the devices 131, 132, 133, 134, 151, 152, 153, 154, 155, 156, and 157 may be configured in the form of hardware. Hereinafter, for ease of description, descriptions will be provided using the terms that exclude the word "device" therefrom. For example, the AMF device 131 is expressed as the AMF 131, and the SMF device 132 is expressed as the SMF 132.

In FIG. 1, the symbols written between lines connected among each network entity, the UE 120, and the RAN (i.e., base station 110) may be the interfaces of the respective entities. For example, interface N1 is used between the UE 120 and the AMF 131, interface N2 is used between the RAN (i.e., base station 110) and the AMF 131, and interface N3 is used between the RAN (i.e., base station 110) and the UPF 133. In the same manner, interface N4 is used between the SMF 132 and the UPF 133, interface N9 is used between or inside the UPFs 133, and interface N6 is used between the UPF 133 and the DN 140.

Hereinafter, a group management method is disclosed, which enables addition, deletion, and/or replacement of a group member in a group for a group-based event monitoring. Although descriptions of the embodiments of the disclosure are provided based on an LTE system, each embodiment may be equally applied to the NR system.

Hereinafter, the service capability server/application server (SCS/AS) of the LTE system may correspond to the AF of the NR system. In the same manner, the service capabilities exposure function (SCEF) of the LTE system may correspond to the NEF of the NR system, the HSS of the LTE system may correspond to the UDM of the NR system, and the MME/SGSN of the LTE system may correspond to the AMF and SMF of the NR system.

Figure 2:
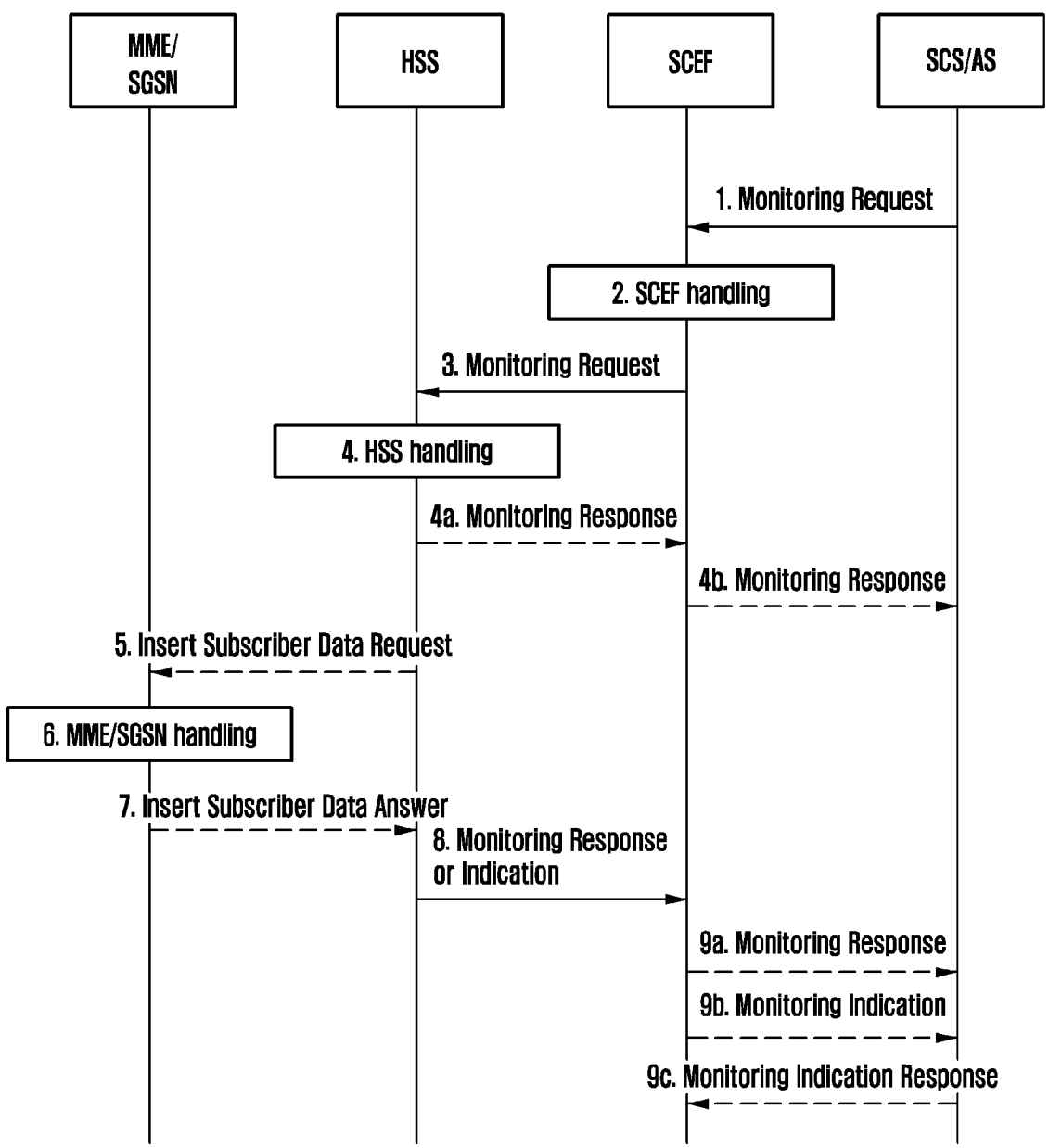
FIG. 2 is a diagram illustrating a procedure of configuring a monitoring event configuration via a home subscriber server (HSS) according to an embodiment of the disclosure.

FIG. 2 is a diagram illustrating a procedure of configuring a monitoring event configuration via an HSS according to an embodiment of the disclosure. Although the flowchart is written based on an LTE system, this may be applicable to a 5G system as described above. A service capability server/application server (SCS/AS) corresponds to an AF, an SCEF corresponds to an NEF, a HSS corresponds to a UDM, and an MME and an SGSN correspond to an AMF and an SMF, respectively.

Referring to FIG. 2, at operation 1, the SCS/AS (or AF) may transmit a monitoring request message to the SCEF (or NEF) in order to request monitoring of a predetermined event. The corresponding message may include parameters as follows: an external identifier or a mobile station international subscriber directory number (MSISDN) or an external group identification (ID), an SCS/AS identifier, a monitoring type, the maximum number of reports, a monitoring duration, a T8 destination address, a T8 long term transaction reference ID (TLTRI) for deletion or group management, a group reporting guard time, MTC provider information, an operation of group management (insertion (addition), deletion, or replacement), and a list of impacted UEs (external identifiers or MSISDNs).

Each of the parameters is described as follows.

The external identifier or MSISDN is a UE ID for identifying a UE outside a network.

The external group ID is a UE group ID for identifying a UE group outside a network.

The SCS/AS identifier is the ID of the SCS/AS server.

The monitoring type indicates the type of a predetermined monitoring event that is requested.

The maximum number of reports is the maximum number of event reports produced.

The monitoring duration is the period of time that a requested monitoring event lasts.

The T8 destination address is address information directing the SCS/AS.

The T8 long term transaction reference ID (TLTRI) is an ID that the SCEF assigns in order to identify a monitoring request. If the SCS/AS desires to delete an existing configured monitoring event or desires to change an existing monitoring event configuration, a TLTRI assigned to the existing monitoring event needs to be included in the request message.

The group reporting guard time is the period of time expended for waiting until reports of UEs are collected in order to transmit the monitoring event report values of the UEs at once, when group-based monitoring is performed.

The MTC provider information is an ID for identifying an MTC service provider or an MTC application, and may be included by the SCEF.

The operation of group management (addition, deletion, or replacement) may be requested by the SCS/AS when a group member UE needs to be added, deleted, and replaced in the case of group event monitoring.

The list of impacted UEs (external identifiers or MSISDNs) may be the list of UEs to be added, deleted, and replaced via a group management operation.

The SCEF that receives the monitoring request may assign a TLTRI to the corresponding request.

If the SCS/AS desires to configure a monitoring event for a UE group, the SCS/AS may include an external group identifier and a group reporting guard time in the request message.

At operation 2, the SCEF may store the following information: the SCS/AS identifier, the T8 Destination Address, the monitoring duration, the maximum number of reports, and the group reporting guard time.

The SCEF may store an TLTRI, and may assign an SCEF reference ID for the corresponding TLTRI.

The SCEF reference ID may be assigned by the SCEF to a monitoring event, and may be used for identifying the corresponding monitoring event when monitoring event reporting or monitoring event deletion is performed. In addition, the SCEF reference ID may be used for searching for information related to a monitoring event in the SCEF. The SCEF reference ID may be stored in a home subscriber server (HSS), a mobility management entity (MME), a serving GPRS support node (SGSN), and an interworking service capabilities exposure function (IWK-SCEF). If a related TLTRI for deletion of an existing monitoring event and to perform group management is received from the SCS/AS, a corresponding SCEF context may be retrieved and a related SCEF reference ID may be retrieved. The SCEF reference ID is an ID used for identifying, by the SCEF, a monitoring event and the monitoring event configuration thereof, and thus, this may be called another name in the NR system.

At operation 3, the SCEF may transmit, to a HSS (or UDM), a monitoring request message including the following information: the external Identifier or MSISDN or the external group identifier, an SCEF ID, an SCEF Reference ID, the monitoring type, the maximum number of reports, the monitoring duration, an SCEF reference ID for deletion or group management, a chargeable party identifier, the group reporting guard time, the MTC provider information, the operation of group management (addition, deletion, or replacement), and the list of impacted UEs (external identifiers or MSISDNs).

At operation 4, the HSS may identify whether the monitoring request message include an error. The HSS may store the following information: the SCEF reference ID, the SCEF ID, the maximum number of reports, the monitoring duration and the SCEF reference ID for deletion or group management as provided by the SCEF, the operation of group management (addition, deletion, or replacement), and the list of impacted UEs (external identifiers or MSISDNs).

At operation 4a, if it is a group-based request, that is, if the external group identifier is received, the HSS may transmit, to the SCEF, a monitoring response message together with the following information: the SCEF Reference ID, the number of UEs, and a cause. If a monitoring event deletion request is received, the HSS may delete a monitoring event configuration corresponding to the SCEF reference ID.

If a group management request is received, the HSS may update the monitoring event configuration corresponding to the SCEF reference ID with a monitoring event configuration and an external group identifier, based on the operation of group management (addition, deletion, or replacement) and the list of impacted UEs (external identifiers or MSISDNs) parameters. In the case of an addition operation, the impacted UEs may be added to the monitoring event. In the case of a deletion operation, the impacted UEs may be deleted from the monitoring event. In the case of a replacement operation, the existing UEs may be replaced with the impacted UEs. If it is desired to delete some existing UEs and to delete new UEs, two operations of group management may be implemented in a single monitoring request message.

At operation 4b, the SCEF may transmit, to the SCS/AS, a monitoring response message including the TLTRI and the cause value. The cause value may indicate information related to the progress in association with the group processing request.

At operation 5, if a predetermine monitoring type or a monitoring event needs to be performed in an MME/SGSN (or AMF/SMF), the HSS may transmit an insert subscriber data request message to the MME/SGSN, for each UE. Particularly, in the case of group event monitoring, for each group member UE, a separate message may be transmitted to each of all the MME/SGSN(s) that respectively serve the group member UEs. The transmitted message may include the following information: the monitoring type, the SCEF ID, the SCEF reference ID, the maximum number of reports, the monitoring duration, the SCEF reference ID for deletion, and the chargeable party identifier.

If the SCEF reference ID for requesting group management is received, an insert subscriber data request message may be transmitted based on the operation of group management (addition, deletion, or replacement) and the list of impacted UEs (external identifiers or MSISDNs). In the case of an addition operation, an insert subscriber data request message (excluding the SCEF reference ID for deletion) may be transmitted to the MME/SGSNs that serve the impacted UEs. In the case of a deletion operation, an inserted subscriber data request message including the SCEF reference ID for deletion may be transmitted to the MME/SGSNs that server the impacted UEs. In the case of a replacement operation, an insert subscriber data request message including the SCEF reference ID for deletion may be transmitted to the MME/SGSNs that serve existing UEs, and an inserted subscriber data request message excluding the SCEF reference ID for deletion may be transmitted to the MME/SGSNs that server the impacted UEs.

At operation 6, the MME/SGSN may store the received parameters, and may perform the monitoring event requested. If the SCEF reference ID for deletion is received, the MME/SGSN may delete a corresponding monitoring configuration.

At operation 7, the monitoring configuration is successfully performed, the MME/SGSN may transmit an insert subscriber data answer (Cause) message to the HSS. If a monitoring event report is available, the report may be included in the subscriber data answer message and may be transmitted.

At operation 8, the HSS may transmit a monitoring response/indication message to the SCEF. This message may include the following parameters: the SCEF Reference ID, the cause, and the monitoring event report. The HSS may delete a monitoring event configuration identified based on the SCEF reference ID.

At operation 9a, the SCEF may transmit a monitoring response message to the SCS/AS. This message may include the cause value and the monitoring event report.

At operation 9b, for a group UE, the SCEF may transmit a monitoring indication message to the SCS/AS. This message may include the TLTRI, the cause, and the monitoring event report.

At operation 9c, the SCS/AS may transmit a monitoring indication response (cause) message to the SCEF.

Figure 3:
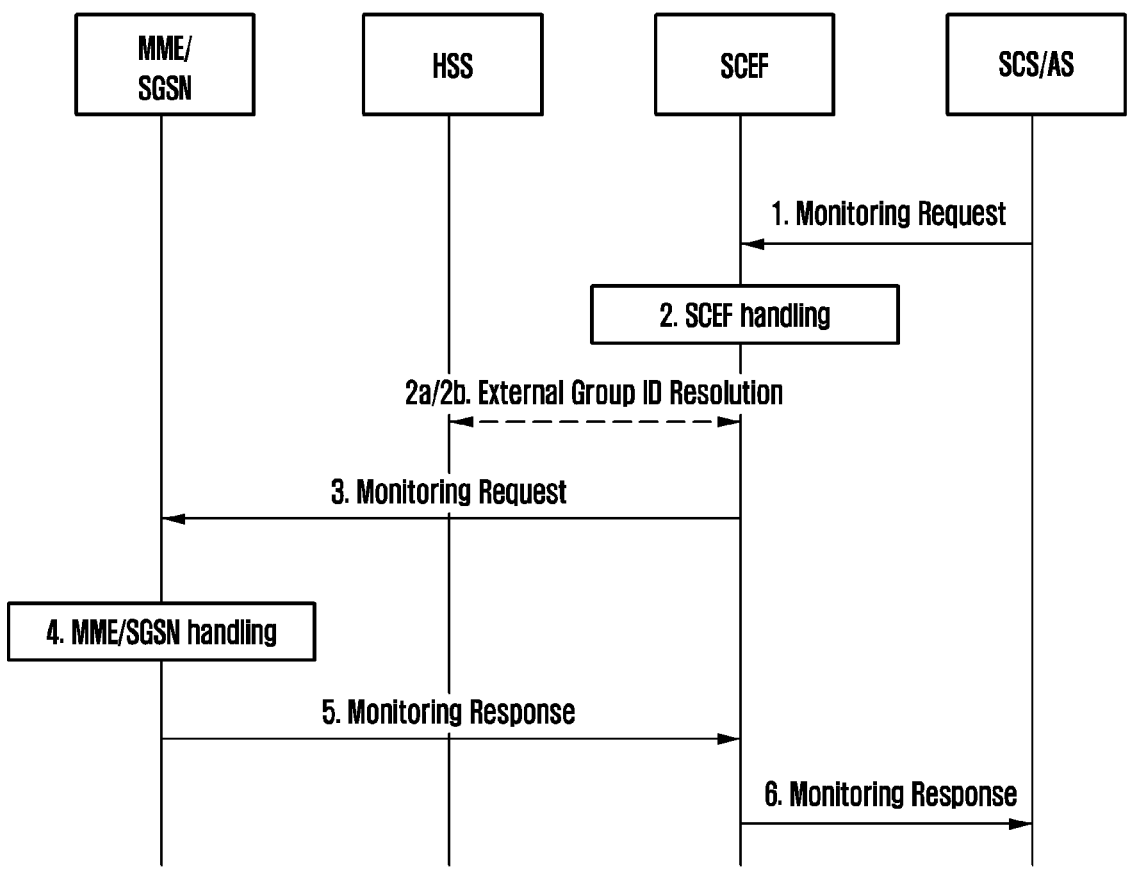
FIG. 3 is a diagram illustrating a procedure of configuring a monitoring event configuration for a mobility management entity (MME)/serving general packet radio service (GPRS) supporting node (SGSN) according to an embodiment of the disclosure.

FIG. 3 is a diagram illustrating a procedure of configuring a monitoring event configuration for an MME/SGSN according to an embodiment of the disclosure. Although the flowchart is written based on an LTE system, this may be applicable to a 5G system as described above. An SCS/AS may correspond to an AF, an SCEF may correspond to an NEF, a HSS may correspond to a UDM, and an MME/SGSN may correspond to an AMF and an SMF, respectively.

Referring to FIG. 3, at operation 1, the service capability server/application server (SCS/AS) may transmit a monitoring request message to a service capability exposure function (SCEF) in order to request monitoring of a predetermined event. The corresponding message may include the parameters as follows: an external identifier or an MSISDN or an external Group ID, an SCS/AS identifier, a monitoring type, the maximum number of reports, a T8 destination address, a TLTRI for deletion or group management, a group reporting guard time, an operation of group management (addition, deletion, or replacement), and a list of impacted UEs (external identifiers or MSISDNs).

Each of the parameters is described as follows. The external identifier or MSISDN is a UE ID for identifying a UE outside a network. The external group ID is a UE group ID for identifying a UE group outside a network. The SCS/AS identifier is the ID of an SCS/AS server. The monitoring type indicates the type of a predetermined monitoring event requested. The maximum number of reports is the maximum number of event reports produced. The monitoring duration is the period of time that a requested monitoring event lasts. The T8 destination address is address information directing the SCS/AS. The T8 long term transaction reference ID (TLTRI) is an ID that the SCEF assigns in order to identify a monitoring request. If the SCS/AS desires to delete an existing configured monitoring event or desires to change an existing monitoring event configuration, a TLTRI assigned to the existing monitoring event needs to be included in the request message. The group reporting guard time is the period of time expended for waiting until reports of UEs are collected in order to transmit the monitoring event reports of the UEs at once, when group-based monitoring is performed. The operation of group management (addition, deletion, or replacement) may be requested by the SCS/AS when a group member UE needs to be added, deleted, and replaced in the case of group event monitoring. The list of impacted UEs (external identifiers or MSISDNs) may be the list of UEs to be added, deleted, and replaced via a group management operation.

The SCEF that receives the monitoring request may assign a TLTRI to the corresponding request. If the SCS/AS desires to configure a monitoring event for a UE group, the SCS/AS may include an external group identifier and a group reporting guard time in the request message.

At operation 2, the SCEF may store the following information: the SCS/AS identifier, the T8 destination address, the monitoring duration, the maximum number of reports, and the group reporting guard time. The SCEF may store a TLTRI, and may assign an SCEF reference ID for the corresponding TLTRI. The SCEF reference ID may be assigned by the SCEF to a monitoring event, and may be used for identifying the corresponding monitoring event when monitoring event reporting or monitoring event deletion is performed. In addition, the SCEF reference ID may be used for searching for information related to the monitoring event in the SCEF. The SCEF reference ID may be stored in a home subscriber server (HSS), a mobility management entity (MME), a serving GPRS support node (SGSN), and an IWK-SCEF. If a related TLTRI for deleting of an existing monitoring event and group management is received from the SCS/AS, a corresponding SCEF context may be retrieved and a related SCEF reference ID may be retrieved. If the external group identifier(s) is included at operation 1, operations 2a/2b are performed.

At operation 2a, the SCEF may transmit an external group ID resolution request (external group identifier(s)) message to the HSS. If a group management request is received, the SCEF may also transmit the following information: the TLTRI for deletion or group management, the operation of group management (addition, deletion, or replacement), and the list of impacted UEs (external identifiers or MSISDNs).

At operation 2b, the HSS may convert the external group identifier(s) into an IMSI-group identifier(s), and may include the value in an external group ID resolution response message and transmit the message to the SCEF.

If group management is requested, the HSS may update the external group identifier based on the operation of group management (addition, deletion, or replacement) and the list of impacted UEs (external identifiers or MSISDNs) parameters. In the case of an addition operation, the impacted UEs may be added to the external group identifier. In the case of a deletion operation, the impacted UEs may be deleted from the external group identifier. In the case of a replacement operation, the existing UEs may be replaced with the impacted UEs. The HSS may include the existing IMSI-group identifier(s) and the updated IMSI-group identifier(s) in an external group ID resolution response message, and may transmit the same to the SCEF.

At operation 3, the SCEF may transmit a monitoring request message to the MME/SGSN, for each UE. Particularly, in the case of group event monitoring, for each group member UE, a separate message may be transmitted to each of all the MME/SGSN(s) that respectively serve the group member UEs. The transmitted message may include the following information: the monitoring type, an SCEF ID, the SCEF reference ID, the maximum number of reports, the monitoring duration, and the SCEF reference ID for deletion.

If the SCEF reference ID for requesting group management is received, a monitoring request message may be transmitted based on the operation of group management (addition, deletion, or replacement) and the list of impacted UEs (external identifiers or MSISDNs). In the case of an addition operation, a monitoring request message (excluding the SCEF reference ID for deletion) may be transmitted to the MME/SGSNs that serve the impacted UEs. In the case of a deletion operation, a monitoring request message including the SCEF reference ID for deletion may be transmitted to the MME/SGSNs that server the impacted UEs. In the case of a replacement operation, a monitoring request message including the SCEF reference ID for deletion may be transmitted to the MME/SGSNs that serve the existing UEs, and a monitoring request message excluding the SCEF reference ID for deletion may be transmitted to the MME/SGSNs that server the impacted UEs.

At operation 4, the MME/SGSN may store the received parameters, and may perform the monitoring event requested. If the SCEF reference ID for deletion is received, the MME/SGSN may delete a corresponding monitoring configuration.

At operation 5, the MME/SGSN may transmit a monitoring response (the SCEF reference ID, a cause, or a monitoring event report) message to the SCEF.

At operation 6, the SCEF may transmit a monitoring response (the TLTRI, a cause, or a monitoring event repot) message to the SCS/AS.

Figure 4:
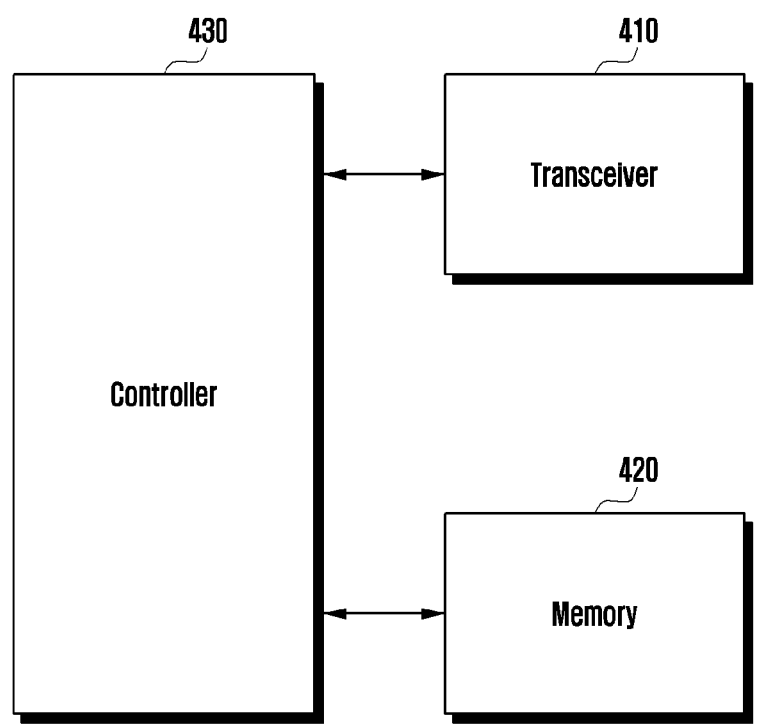
FIG. 4 is a diagram illustrating the structure of a network entity (including an NF, and NF instance) according to an embodiment of the disclosure.

FIG. 4 is a diagram illustrating the structure of a network entity (including an NF and an NF instance) according to an embodiment of the disclosure.

The network entity illustrated in FIG. 4 may be at least one of the above-described MME, SGSN, HSS, SCEF, SCS/AS, AMF, SMF, UDM, NEF, and AF, and is not limited to a predetermined network entity. In addition, the network entity may be provided in the form of an instance, and if the network entity is provided in the form of an instance, the network entity may be in the form of code of software, and may be in the state of capable of operating by being assigned with a physical and/or logical resource from a computing system in order to perform the function of an NF in a physical computing system, for example, a predetermined computing system existing on a core network. Accordingly, the structure of FIG. 4 may show physically divided entities, or logically divided entities.

Referring to FIG. 4, the network entity (NF) may include a transceiver 410, a memory 420, and a controller 430. According to the above-described communication method of the network entity, the transceiver 410, the controller 430, and the memory 420 may operate. However, the elements of the network entity are not limited to the above-descried example. For example, the network entity may include more or fewer elements than the above-described elements. In addition, the transceiver 410, the controller 430, and the memory 420 may be configured as a single chip. In addition, the controller 430 may include one or more processors.

The transceiver 410 is the collective name for the receiver of the network entity and the transmitter of the network entity, and is capable of performing signal transmission or reception with a base station, a UE, or another network entity. A signal that is transmitted to or received from a base station, a UE, or another network entity may include control information and data. To this end, the transceiver 410 may include an RF transmitter that up-converts and amplifies the frequency of a transmitted signal, an RF receiver that low-noise amplifies a received signal and down-converts the frequency of the signal, and the like. This is merely an example of the transceiver 410, and the elements of the transceiver 410 are not limited to an RF transmitter and an RF receiver. In addition, the transceiver is an interface for transmitting or receiving data, and is also capable of performing data transmission or reception via a backhaul network in a wired manner, in addition to data transmission or reception in a wireless manner.

In addition, the transceiver 410 may receive a signal via a wireless channel and output the same to the controller 430, and may transmit a signal output from the controller 430 via a wireless channel.

The memory 420 may store a program and data needed when the NF operates. In addition, the memory 420 may store control information or data included in a signal obtained by the NF. The memory 420 may be configured as a storage medium such as ROM, RAM, hard disk, CD-ROM, DVD, and the like, or a combination of storage media. In addition, the memory 420 may be included in the controller 430, as opposed to being separately configured.

The controller 430 may control a series of processes such that the network entity operates according to the above-described embodiments of the disclosure. For example, the controller 430 may receive a control signal and a data signal via the transceiver 410, and may process the received control signal and data signal. In addition, the controller 430 may transmit the processed control signal and data signal via the transceiver 410. A plurality of controllers 430 may be present, and the controller 430 may control the elements of the NF by operating programs stored in the memory 420.

Figure 5:
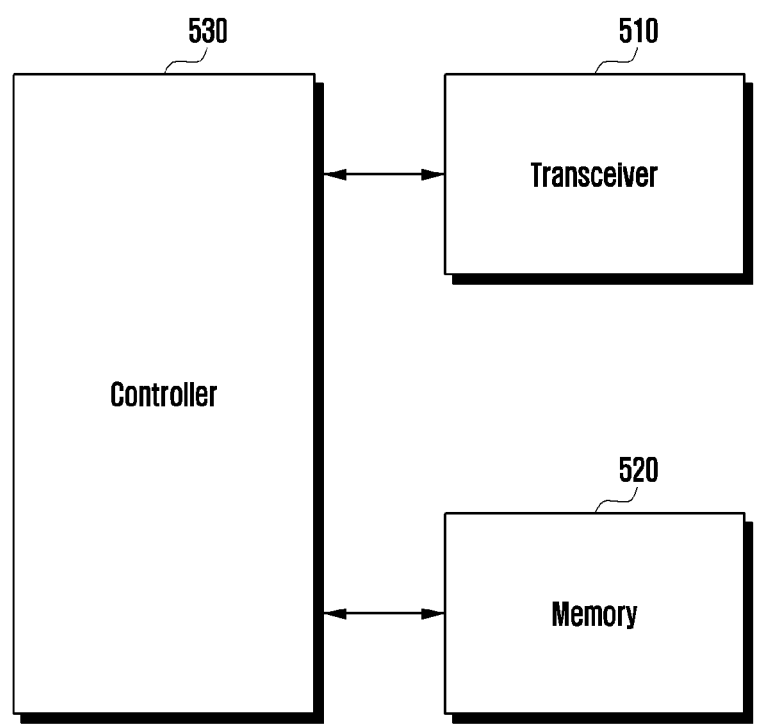
FIG. 5 is a diagram illustrating the structure of a user equipment (UE) according to an embodiment of the disclosure.

FIG. 5 is a diagram illustrating the structure of a UE according to an embodiment of the disclosure.

Referring to FIG. 5, the UE may include a transceiver 510, a memory 520, and a controller 530. According to the above-described communication method of the UE, the transceiver 510, the controller 530, and the memory 520 of the UE may operate. However, the elements of the UE are not limited to the above-descried example. For example, the UE may include more or fewer elements than the above-described elements. In addition, the transceiver 510, the controller 530, and the memory 520 may be configured as a single chip. In addition, the controller 530 may include one or more processors.

The transceiver 510 is the collective name for the receiver of the UE and the transmitter of the UE, and may be capable of performing signal transmission or reception with a base station, an NF, or another UE. A signal that is transmitted to or received from a base station, an NF, or another UE may include control information and data. To this end, the transceiver 510 may include an RF transmitter that up-converts and amplifies the frequency of a transmitted signal, an RF receiver that low-noise amplifies a received signal and down-converts the frequency of the signal, and the like. This is merely an example of the transceiver 510, and the elements of the transceiver 510 are not limited to an RF transmitter and an RF receiver.

In addition, the transceiver 510 may receive a signal via a wireless channel and output the same to the controller 530, and may transmit a signal output from the controller 530 via a wireless channel.

The memory 520 may store a program and data needed when the UE operates. In addition, the memory 520 may store control information or data included in a signal obtained by the UE. The memory 520 may be configured as a storage medium such as ROM, RAM, hard disk, CD-ROM, DVD, and the like, or a combination of storage media. In addition, the memory 520 may be included in the controller 530, as opposed to being separately configured.

The controller 530 may control a series of processes such that the UE operates according to the above-described embodiments of the disclosure. For example, the controller 530 may receive a control signal and a data signal via the transceiver 510, and may process the received control signal and data signal. In addition, the controller 530 may transmit the processed control signal and data signal via the transceiver 510. A plurality of controllers 530 may be present, and the controller 530 may control the elements of the UE by operating programs stored in the memory 520.

Figure 6:
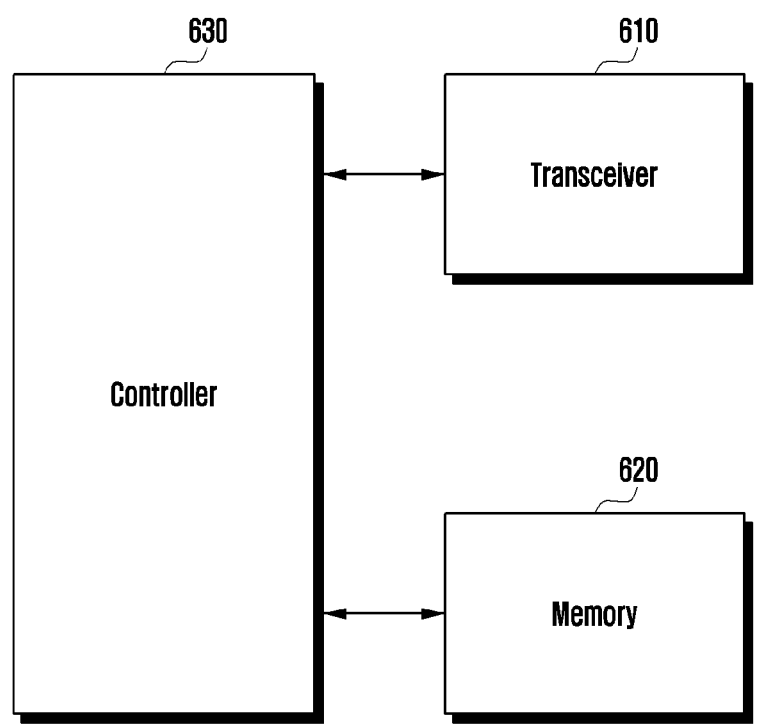
FIG. 6 is a diagram illustrating the structure of a base station according to an embodiment of the disclosure.

FIG. 6 is a diagram illustrating the structure of a base station according to an embodiment of the disclosure.

Referring to FIG. 6, the base station may include a transceiver 610, a memory 620, and a controller 630. According to the above-described communication method of the base station, the transceiver 610, the controller 630, and the memory 620 may operate. However, the elements of the base station are not limited to the above-descried example. For example, the base station may include more or fewer elements than the above-described elements. In addition, the transceiver 610, the controller 630, and the memory 620 may be configured as a single chip. In addition, the controller 630 may include one or more processors.

The transceiver 610 is the collective name for the receiver of the base station and the transmitter of the base station, and may be capable of performing signal transmission or reception with a UE, an NF, or another base station. A signal that is transmitted to or received from a UE, an NF, or another base station may include control information and data. To this end, the transceiver 610 may include an RF transmitter that up-converts and amplifies the frequency of a transmitted signal, an RF receiver that low-noise amplifies a received signal and down-converts the frequency of the signal, and the like. This is merely an example of the transceiver 610, and the elements of the transceiver 610 are not limited to an RF transmitter and an RF receiver.

In addition, the transceiver 610 may receive a signal via a wireless channel and output the same to the controller 630, and may transmit a signal output from the controller 630 via a wireless channel.

The memory 620 may store a program and data needed when the base station operates. In addition, the memory 620 may store control information or data included in a signal obtained by the base station. The memory 620 may be configured as a storage medium such as ROM, RAM, hard disk, CD-ROM, DVD, and the like, or a combination of storage media. In addition, the memory 620 may be included in the controller 530, as opposed to being separately configured.

The controller 630 may control a series of processes such that the base station operates according to the above-described embodiments of the disclosure. For example, the controller 630 may receive a control signal and a data signal via the transceiver 610, and may process the received control signal and data signal. In addition, the controller 630 may transmit the processed control signal and data signal via the transceiver 610. A plurality of controllers 630 may be present, and the controller 630 may control the elements of the base station by operating programs stored in the memory 620.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

While the disclosure has been shown and described with reference to various embodiments thereof, it will be understood by those skilled in the art that various changes in form and details may be made therein without departing from the spirit and scope of the disclosure as defined by the appended claims and their equivalents. For example, one embodiment of the disclosure may be partially combined with other embodiments to operate a base station and a terminal. Further, the embodiments of the disclosure may be applied to other communication systems, and other variants based on the technical idea of the embodiments may also be implemented.

What is claimed is:

1. A method for managing an event monitoring for a group of terminals in a wireless communication system performed by a first network function entity, the method comprising:

receiving, from a second network function entity, a monitoring request message for modifying a configured monitoring event, the monitoring request message including a first identifier corresponding to the configured monitoring event, a second identifier for deletion operation, an operation of group management for the group of terminals, and a terminal identifier indicating a terminal impacted by the operation, wherein the operation includes at least one of an addition of the terminal to the group or a deletion of the terminal from the group;

updating the configured monitoring event for the impacted terminal identified by the terminal identifier based on the operation, wherein the updating is adding the impacted terminal to the group of terminals for the configured monitoring event or deleting the impacted terminal from the group of terminals for the configured monitoring event;

identifying whether the configured monitoring event needs to be performed in a third network function entity; and in case that the configured monitoring event is needed to be performed in the third network function entity, transmitting, to the third network function entity associated with the impacted terminal, information for modifying the configured monitoring event, the information including the first identifier and the terminal identifier, wherein in case that the operation is the deletion of the terminal from the group, the second identifier is transmitted to the third network function entity.

2. The method of claim 1,
wherein the monitoring request message is generated based on a message from an application function entity associated with the configured monitoring event, the monitoring request message including a T8 long term transaction reference ID (TLTRI) for identifying the configured monitoring event, the operation, and the terminal identifier.

3. The method of claim 1,
wherein the configured monitoring event is modified at the third network function entity based on the information,
wherein the impacted terminal is monitored for the monitoring event by the third network function entity, in case that the operation is the addition, and
wherein the impacted terminal is suspended from monitoring for the monitoring event at the third network function entity, in case that the operation is the deletion.

4. The method of claim 1, wherein, in case that the operation is the addition, the updating of the configured monitoring event further comprises:
monitoring the impacted terminal for the configured monitoring event.

5. The method of claim 1, wherein, in case that the operation is the deletion, the updating of the configured monitoring event further comprises:
stop monitoring the impacted terminal for the configured monitoring event.

6. The method of claim 1,
wherein the first network function entity includes a home subscriber server (HSS),
wherein the second network function entity includes a service capability exposure function (SCEF), and
wherein the third network function entity includes at least one of a mobile management entity (MME) or a serving general packet radio service (GPRS) support node (SGSN).

7. The method of claim 1,
wherein the first network function entity includes a unified data management (UDM),
wherein the second network function entity includes a network exposure function (NEF), and
wherein the third network function entity includes at least one of an access and mobility management function (AMF) or a session management function (SMF).

8. A method for managing an event monitoring for a group of terminals in a wireless communication system performed by a second network function entity, the method comprising:
receiving, from an application function entity associated with a configured monitoring event, a first monitoring request message for modifying the configured monitoring event, the first monitoring request message including a first identifier corresponding to the configured monitoring event, an operation of group management for the group of terminals, and a terminal identifier indicating a terminal impacted by the operation; and
transmitting, to a first network function entity, a second monitoring request message based on the first monitoring request message, the second monitoring request message including a second identifier corresponding to the configured monitoring event, a third identifier for deletion operation, the operation and the terminal identifier, wherein the operation includes at least one of an addition of the terminal to the group or a deletion of the terminal from the group,
wherein the configured monitoring event is updated for the impacted terminal identified by the terminal identifier based on the operation,
wherein information for modifying the configured monitoring event is transmitted to a third network function entity associated with the impacted terminal from the first network function entity in case that the configured monitoring event is needed to be performed in the third network function entity, based on the second monitoring request message, the information including the second identifier and the terminal identifier, and
wherein in case that the operation is deletion of the terminal from the group, the third identifier is transmitted to the third network function entity.

9. The method of claim 8,
wherein the first identifier for identifying the configured monitoring event is a T8 long term transaction reference ID (TLTRI), and
wherein the second identifier corresponds to the TLTRI.

10. The method of claim 8,
wherein the configured monitoring event is modified at the third network function entity based on the information,
wherein the impacted terminal is monitored for the monitoring event by the third network function entity, in case that the operation is the addition, and
wherein the impacted terminal is suspended from monitoring for the monitoring event at the third network function entity, in case that the operation is the deletion.

11. The method of claim 8, wherein, in case that the operation is the addition, the impacted terminal is added to the group of terminals for the configured monitoring event and monitored for the configured monitoring event.

12. The method of claim 8, wherein, in case that the operation is the deletion, the impacted terminal is deleted from the group of terminals for the configured monitoring event, and suspended from monitoring for the configured monitoring event.

13. The method of claim 8,
wherein the first network function entity includes a home subscriber server (HSS),
wherein the second network function entity includes a service capability exposure function (SCEF), and
wherein the third network function entity includes at least one of a mobile management entity (MME) or a serving general packet radio service (GPRS) support node (SGSN).

14. The method of claim 8,
wherein the first network function entity includes a unified data management (UDM),
wherein the second network function entity includes a network exposure function (NEF), and
wherein the third network function entity includes at least one of an access and mobility management function (AMF) or a session management function (SMF).

15. A first network function entity for managing an event monitoring for a group of terminals in a wireless communication system, the first network function entity comprising:
a transceiver; and
a controller configured to:
receive, from a second network function entity, a monitoring request message for modifying a configured monitoring event, the monitoring request message including a first identifier corresponding to the configured monitoring event, a second identifier for deletion operation, an operation of group management for the group of terminals, and a terminal identifier indicating a terminal impacted by the operation, wherein the operation includes at least one of an addition of the terminal to the group or a deletion of the terminal from the group, update the configured monitoring event for the impacted terminal identified by the terminal identifier based on the operation, wherein the update is adding the impacted terminal to the group of terminals for the configured monitoring event or deleting the impacted terminal from the group of terminals for the configured monitoring event, identify whether the configured monitoring event needs to be performed in a third network function entity, and in case that the configured monitoring event is needed to be performed in the third network function entity, transmit, to the third network function entity associated with the impacted terminal, information for modifying the configured monitoring event, the information including the first identifier and the terminal identifier, wherein in case that the operation is the deletion of the terminal of the group, the second identifier is transmitted to the third network function entity.

16. The first network function entity of claim 15, wherein the monitoring request message is generated based on a message from an application function entity associated with the configured monitoring event, the monitoring request message including a T8 long term transaction reference ID (TLTRI) for identifying the configured monitoring event, the operation, and the terminal identifier.

17. The first network function entity of claim 15, wherein the configured monitoring event is modified at the third network function entity based on the information,
wherein the impacted terminal is monitored for the monitoring event by the third network function entity, in case that the operation is the addition, and
wherein the impacted terminal is suspended from monitoring for the monitoring event at the third network function entity, in case that the operation is the deletion.

18. The first network function entity of claim 15, wherein, in case that the operation is the addition, the controller is further configured to:
monitor the impacted terminal for the configured monitoring event.

19. The first network function entity of claim 15, wherein, in case that the operation is the deletion, the controller is further configured to:
stop monitoring the impacted terminal for the configured monitoring event.

20. The first network function entity of claim 15, wherein the first network function entity includes a home subscriber server (HSS),
wherein the second network function entity includes a service capability exposure function (SCEF), and
wherein the third network function entity includes at least one of a mobile management entity (MME) or a serving general packet radio service (GPRS) support node (SGSN).

21. The first network function entity of claim 15, wherein the first network function entity includes a unified data management (UDM),
wherein the second network function entity includes a network exposure function (NEF), and wherein the third network function entity includes at least one of an access and mobility management function (AMF) or a session management function (SMF).

22. A second network function entity for managing an event monitoring for a group of terminals in a wireless communication system, the second network function entity comprising:
a transceiver; and
a controller configured to:
receive, from an application function entity associated with a configured monitoring event, a first monitoring request message for modifying the configured monitoring event, the first monitoring request message including a first identifier corresponding to the configured monitoring event, an operation of group management for the group of terminals, and a terminal identifier indicating a terminal impacted by the operation, and
transmit, to a first network function entity, a second monitoring request message based on the first monitoring request message, the second monitoring request message including a second identifier corresponding to the configured monitoring event, a third identifier for deletion operation, the operation and the terminal identifier, wherein the operation includes at least one of an addition of the terminal to the group or a deletion of the terminal from the group,
wherein the configured monitoring event is updated for the impacted terminal identified by the terminal identifier based on the operation,
wherein information for modifying the configured monitoring event is transmitted to a third network function entity associated with the impacted terminal from the first network function entity in case that the configured monitoring event is needed to be performed in the third network function entity, based on the second monitoring request message, the information including the second identifier and the terminal identifier, and
wherein in case that the operation is deletion of the terminal from the group, the third identifier is transmitted to the third network function entity.

23. The second network function entity of claim 22, wherein the first identifier for identifying the configured monitoring event is a T8 long term transaction reference ID (TLTRI), and
wherein the second identifier corresponds to the TLTRI.

24. The second network function entity of claim 22, wherein the configured monitoring event is modified at the third network function entity based on the information,
wherein the impacted terminal is monitored for the monitoring event by the third network function entity, in case that the operation is the addition, and
wherein the impacted terminal is suspended from monitoring for the monitoring event at the third network function entity, in case that the operation is the deletion.

25. The second network function entity of claim 22, wherein, in case that the operation is the addition, the impacted terminal is added to the group of terminals for the configured monitoring event and monitored for the configured monitoring event.

26. The second network function entity of claim 22, wherein, in case that the operation is the deletion, the impacted terminal is deleted from the group of terminals for the configured monitoring event, and suspended from monitoring for the configured monitoring event.

27. The second network function entity of claim 22,
wherein the first network function entity includes a home subscriber server (HSS),
wherein the second network function entity includes a service capability exposure function (SCEF), and
wherein the third network function entity includes at least one of a mobile management entity (MME) or a serving general packet radio service (GPRS) support node (SGSN).

28. The second network function entity of claim 22,
wherein the first network function entity includes a unified data management (UDM),
wherein the second network function entity includes a network exposure function (NEF), and
wherein the third network function entity includes at least one of an access and mobility management function (AMF) or a session management function (SMF).

* * * * *